United States Patent [19]

Kato et al.

[11] Patent Number: 5,578,754
[45] Date of Patent: Nov. 26, 1996

[54] VIBRATION-TYPE ANGULAR-VELOCITY SENSOR

[75] Inventors: Kenzi Kato, Okazaki; Tomoyuki Kanda, Inabe-gun, both of Japan

[73] Assignee: Nippondenso Co., Ltd., Kariya, Japan

[21] Appl. No.: 358,077

[22] Filed: Dec. 15, 1994

[30] Foreign Application Priority Data

Dec. 16, 1993 [JP] Japan .................................. 5-316255

[51] Int. Cl.[6] .................................................. G01P 9/04
[52] U.S. Cl. ............................. 73/504.12; 73/504.02
[58] Field of Search ........................ 73/504.02, 504.04, 73/504.12, 504.14, 504.16; 310/329, 370; 29/25, 35, 595

[56] References Cited

U.S. PATENT DOCUMENTS

| | | | |
|---|---|---|---|
| 4,598,585 | 7/1986 | Boxenhorn | 73/504.12 |
| 5,476,007 | 12/1995 | Nakamura | 73/504.12 |

FOREIGN PATENT DOCUMENTS

| | | | |
|---|---|---|---|
| 084704 | 8/1983 | European Pat. Off. . | |
| 58-174854 | 10/1983 | Japan . | |
| 61-114123 | 5/1986 | Japan . | |
| 2-163608 | 6/1990 | Japan | 73/517 AV |
| 2-218914 | 8/1990 | Japan | 73/504 |
| 2223817 | 9/1990 | Japan . | |
| 4134208 | 5/1992 | Japan . | |
| 4142420 | 5/1992 | Japan . | |
| 6249667 | 9/1994 | Japan . | |
| 2223309 | 4/1990 | United Kingdom . | |

*Primary Examiner*—Christine K. Oda
*Attorney, Agent, or Firm*—Cushman, Darby & Cushman; IP Group of Pillsbury; Madison & Sutro LLP

[57] ABSTRACT

A vibration-type angular-velocity sensor which can be reduced in size in the direction of the axis of the angular-velocity to be measured. A vibration body 11 comprises a pair of parallel driving plates 121 and 122 bent into a U-shape and extending in a Y direction, and a pair of detection plates 151 and 152 are so formed as to extend in mutually opposite directions in an X-axis direction by bending outwards the distal ends of the driving plates 121 and 122, respectively. The driving plates 121 and 122 are supported at a connecting plate 13 portion by a support member 14 in such a manner as to be capable of vibration. Piezoelectric devices 161 and 162 are bonded to the surfaces of the driving plates 121 and 122, respectively. When an A.C. voltage is applied, the driving plates are vibrated in mutually opposite directions. When a rotary angular-velocity, around the Z-axis of the sensor, generates a force in a Y-axis direction, due to the Coriolis effect, on the detection plates 151, 152, the Coriolis force is detected by piezoelectric devices 171 and 172. Accordingly, detection signals proportional to the angular-velocity are outputted from the detection piezoelectric devices 171 and 172.

8 Claims, 4 Drawing Sheets

VIBRATION-TYPE ANGULAR-VELOCITY SENSOR

BACKGROUND OF THE INVENTION

1. Field of the Invention

This invention relates to a vibration-type angular-velocity detector. The detector is mountable on a vehicle, such as a four wheel drive vehicle and is utilized as a yaw-rate detection mechanism in a vehicle posture control system or a navigation system.

2. Description of the Related Art

To control posture of a vehicle, angular-velocity information of the vehicle, such as the yaw-rate, must be detected. Sensor mechanisms for detecting angular-velocity are typically mounted on a vehicle.

A vibration-type angular-velocity sensor has been used for detecting the angular-velocity of a vehicle. A tuning-fork type sensor, such as shown in FIG. 5 of the accompanying drawings, or a tuning-fork type vibrating body, shown in FIG. 6, has been used for this purpose.

In the angular velocity sensor shown in FIG. 5, driving piezoelectric devices 52 are bonded to opposed surfaces of a vibration body 51. The vibration body 51 is shaped into a rectangular cube. Detection piezoelectric devices 53 are bonded to the other opposed surfaces of the vibration body 51. The vibrating body 51 vibrates when an A.C. driving signal is applied to the driving piezoelectric devices 52. The angular velocity of the vibration body 51 is detected by the detection piezoelectric devices 53.

The tuning-fork type angular-velocity sensor, shown in FIG. 6, comprises a tuning-fork type driving body 55 including a pair of leg plates 551 and 552. Driving piezoelectric devices 56 are bonded to the leg plates 551 and 552, respectively. Detection plates 571 and 572 are integrally connected to the distal ends of the leg plates 551 and 552, respectively, in such a manner as to cross, at right angles, the vibration planes of the leg plates 551 and 552. Detection piezoelectric devices 581 and 582 are bonded to the plane surfaces of the detection plates 571 and 572, respectively.

Both of the tuning fork type angular-velocity sensors, having the construction described above and shown in FIGS. 5 and 6, are used such that the longitudinal direction (Z axis) of the vibration bodies 51 and 55 are is aligned with the axis of the angular velocity. Accordingly, when the angular velocity sensor is mounted on a vehicle so as to detect a yaw-rate, for example, the height of the sensor mechanism cannot be reduced.

An electronic control system, such as a posture control system or a navigation system, must detect the yaw-rate of the vehicle. Therefore, it is necessary to assemble the angular-velocity detection mechanism into the electronic control system. However, the angular velocity sensor, having the construction shown in FIG. 5 or 6, cannot be easily assembled into the electronic control system because of the the relatively large height of the vibration body.

Other types of angular-velocity detection mechanisms and means for reducing the size of the overall construction may be conceivable. However, in order to obtain a suitable detection performance, the relative accuracy of the vibrating body must be sufficiently improved and its size reduced, without increasing production costs.

SUMMARY OF THE INVENTION

The present invention was completed in view of the background described above. The present invention is directed to a vibration-type angular-velocity sensor that is smaller in the direction of the axis of an angular velocity so that the vibration body can be easily assembled into an electronic control apparatus. The present invention is also directed to a sensor that can be effectively adapted to a vehicle posture control system including 4 WD vehicles, or a navigation system, for example.

To accomplish the objects described above, the present invention provides a vibration-type angular-velocity sensor comprising a vibrating body supported in a manner to allow it to vibrate at a predetermined frequency. A detection element is vibrated in the vibration plane of the vibrating body by a Coriolis force generated by an angular-velocity about an axis perpendicular to the vibrating plane of the vibrating body. The detection element is vibrated in a direction perpendicular to the vibrating direction of the vibrating body and to the axis, and detects the Coriolis force by detecting the vibration.

In the vibration-type angular-velocity sensor having the construction described above, when a driving means is driven by an A.C. signal, a driving body extending in a first direction (Y-axis direction) is vibrated in a second direction (X-axis direction). A detection body that is integral with the driving body is also vibrated in the second direction. When the sensor has an angular-velocity about a third direction (the Z-axis direction), the detecting body is vibrated in the first direction by the Coriolis force, and the detection means detects this Coriolis force. In this case, if the magnitude of the vibration in the second direction that acts on the detection body due to the vibration of the vibrating body is constant, the detection means detects a signal which is proportional to the Z axis angular-velocity. For example, the yaw rate of a vehicle can be detected precisely, and the size of the detection body in the direction of the axis of the angular-velocity can be sufficiently reduced.

DESCRIPTION OF THE PREFERRED EMBODIMENTS

Hereinafter, the preferred embodiments of the present invention will be explained with reference to the accompanying drawings.

Figure 1:
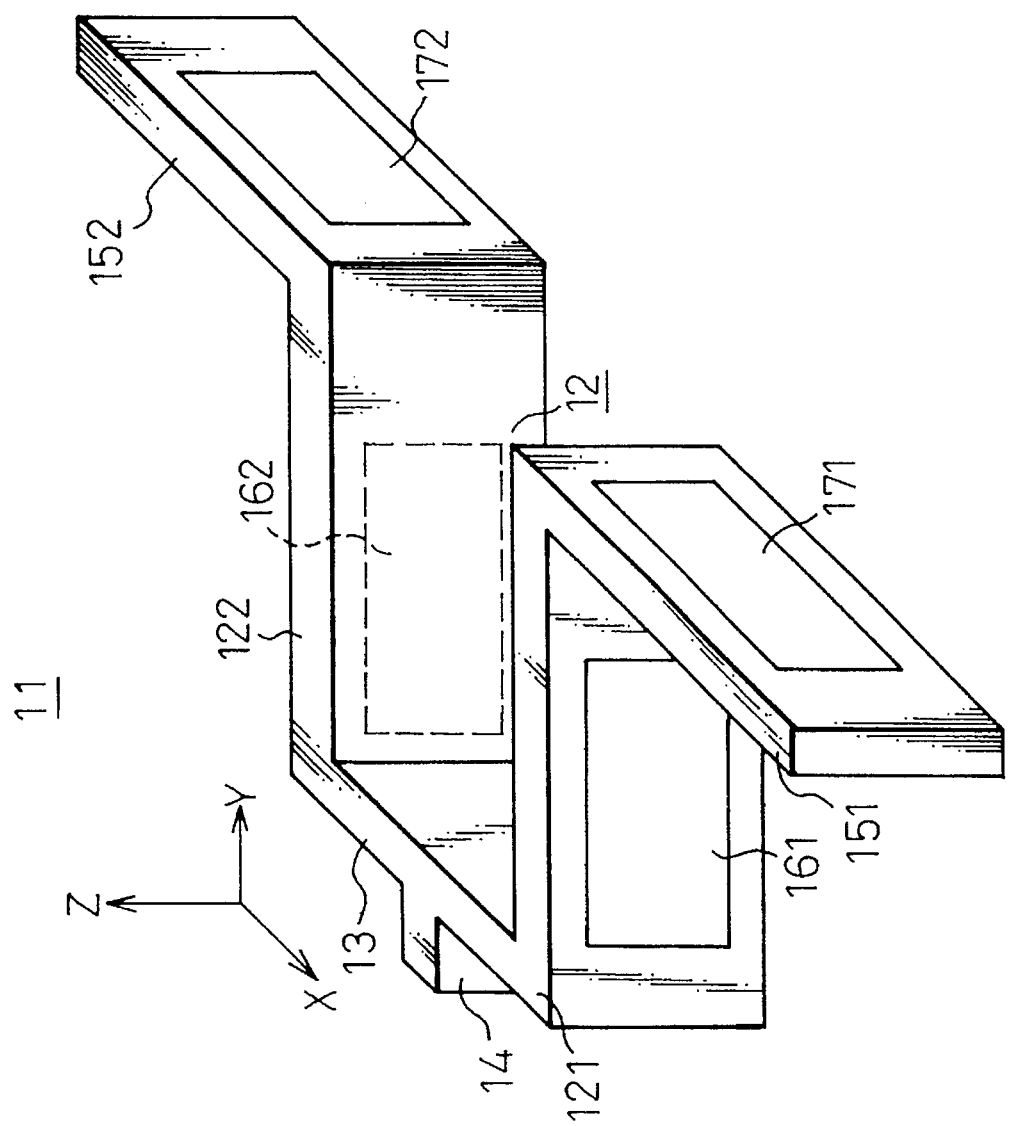
FIG. 1 is a perspective view useful for explaining a vibration-type angular-velocity sensor according to an embodiment of the present invention.

FIG. 1 shows the construction of an embodiment of the present invention. A vibrating body 11 is equipped with a driving portion 12 comprised by a pair of vibration plates 121 and 122. The driving plates 121 and 122 are integrally connected at the proximal end portions thereof to a connecting plate 13 to form a tuning fork. A support member 14 is integrally formed at the center of the connecting plate 13, by welding, etc., to support the connecting plate 13.

Detection plates 151 and 152 are integrally formed at the distal ends of the vibrating plates 121 and 122, respectively, in such a manner as to extend outwardly and perpendicularly with respect to the driving plates 121 and 122. The connecting plate 13, the driving plates 121 and 122 and the detection plates 151 and 152, which together constitute the vibrating body 11, can be shaped by bending a thin strip of a metal, for example, a permanent flexible material such as an iron-nickel alloy sheet, into a U-shape and bending outwardly the resulting U-shaped member.

Rectangular driving piezoelectric devices 161 and 162 are bonded, using an adhesive, to the outside surface of the driving plates 121 and 122, respectively. An A.C. voltage can be applied to the driving piezoelectric devices 161 and 162 to drive the driving piezoelectric devices 161 and 162, though details are not shown in the drawing. When the driving A.C. voltage is applied to these driving piezoelectric devices 161 and 162, the driving plates 121 and 122 symmetrically vibrate in mutually opposite directions. This direction is labeled the X-axis direction in this drawing.

Rectangular detection piezoelectric devices 171 and 172 are bonded by an adhesive to the surface of the detection plates 151 and 152, respectively. These detection piezoelectric devices 171 and 172 detect vibration in the Y-axis direction, which is orthogonal to the X-axis direction of the detection plates 151 and 152, and output the detection result to a detection circuit which is not shown in the drawing.

In the vibrating body 11 having the construction described above, the A.C. voltage is applied to the driving piezoelectric devices 161 and 162, and the driving plates 121 and 122 vibrate in the X-axis direction. Under this state, when the sensor rotates about the Z-axis, a Coriolis force acting in the Y-axis direction develops in the detection plates 151 and 152. This Coriolis force generates a voltage in the detection piezoelectric devices 171 and 172.

In order to allow the angular-velocity sensor having the construction described above to operate as an angular-velocity sensor, an A.C. voltage having a frequency equal to the resonance frequency of the vibrating body 11 is applied to the driving piezoelectric devices 161 and 162. Due to the application of this A.C. voltage, the driving plates 121 and 122 start to symmetrically vibrate, in mutually opposite directions, by means of the inverse piezoelectric effect, and the vibrating body 11 starts a tuning-fork type vibration with the support member 14 as its center.

Due to this tuning-fork type vibration, velocities V, having mutually opposite directions, appear in the X-axis direction on the pair of detection plates 151 and 152. Because the force in the Y-axis direction does not act on the detection plates 151 and 152 when the vibrating body 11 does not rotate around the Z-axis, the detection signals are not produced by the detection piezoelectric devices 171 and 172 that are bonded to the detection plates 151 and 152, respectively.

When the vibrating body 11 rotates with an angular-velocity ω around the Z-axis acts, the Coriolis force is [2×m×V×ω] (where m is the mass of each detection plate 151 and 152) and acts in mutually opposite directions and in the Y-axis direction upon the detection plates 151 and 152 that vibrate at the velocity V in the mutually opposite directions and in the X-axis direction. Consequently, the detection plates 151 and 152 vibrate in the Y-axis direction, and the A.C. signals proportional to this vibration occur in the detection piezoelectric devices 171 and 172 due to the piezoelectric effect in these detection piezoelectric devices 171 and 172.

Accordingly, if the magnitude of the velocity V of the detection plates 151 and 152 produced by the vibration plates 121 and 122 is kept constant, a signal proportional to the angular-velocity ω is outputted from the detection piezoelectric devices 171 and 172.

In other words, as can be understood from the definite embodiment of the present invention shown in FIG. 1, the yaw-rate type and vibration-type angular-velocity sensor according to the present invention basically comprises the vibrating body 11 which is supported in such a manner as to be capable of vibration and is driven by the driving bodies 161 and 162 driven at a predetermined frequency, and the detection devices 171 and 172 which are vibrated in the vibration plane of the vibrating body by the Coriolis force generated by the angular-velocity in the direction perpendicular to the vibration plane of the vibration body, in the direction perpendicular to the vibration direction of the vibration body and to the axis, and detects the Coriolis force by detecting this vibration.

The construction of the vibration-type angular-velocity sensor is as follows. The driving means 161 and 162 for vibrating the vibrating body 11 in the second direction perpendicular to the first direction which is in conformity with the longitudinal direction of the vibration body 11 are disposed on the vibration body 11 so supported as to be capable of vibration, and the detection bodies 151 and 152 are integrally bonded to the vibration body 11 in such a manner as to extend in the vibrating direction of the vibration body 11. Further, the detection means 171 and 172 for detecting the Coriolis force acting in the first direction are fitted to the detection bodies 151 and 152, respectively, so that they detect the Coriolis force produced by the rotary angular-velocity occurring in the third direction perpendicular to the plane defined by the first and second directions.

Figure 2:
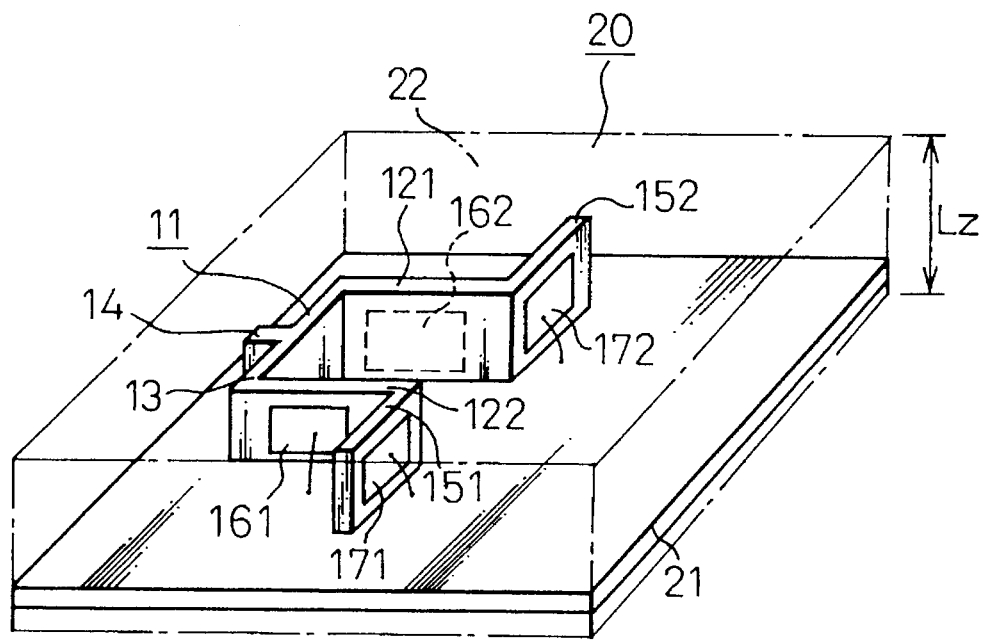
FIG. 2 is an explanatory view useful for explaining the assembled state of the angular-velocity sensor in an electronic appliance.
Figure 3:
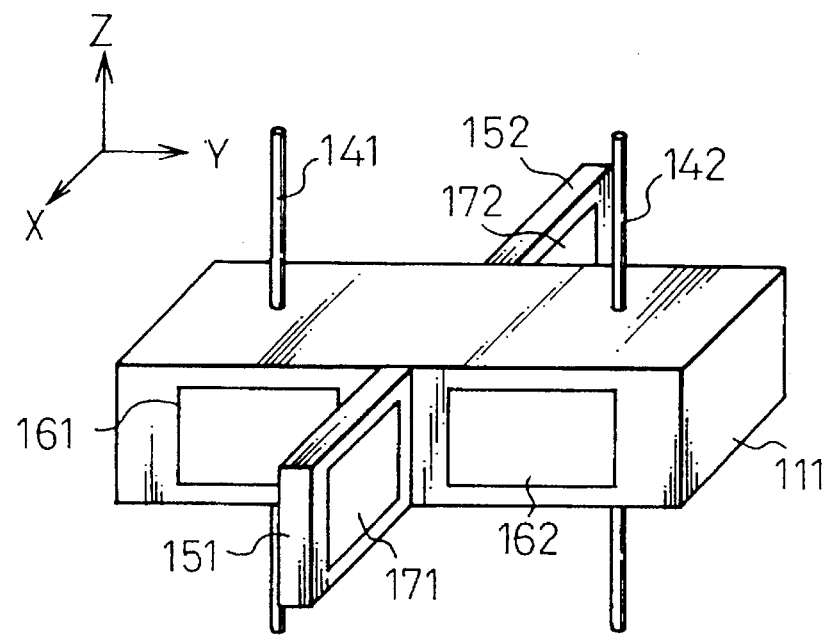
FIG. 3 is a perspective view showing the second embodiment of the present invention.

FIG. 2 is an explanatory view showing the vibration body having such a construction is mounted to an electronic control appliance 20 for a vehicle. The vibrating body 11 is fitted and fixed by the support member 14 onto the surface of a printed circuit board 21. The driving piezoelectric devices 161, 162 and the detection piezoelectric devices 171, 172 are connected to circuit wiring portions of the printed circuit board 21 by thin conductor wires, respectively. This assembly is encompassed, as a whole, by a case 22 in a suitable way.

In the angular-velocity sensor having the construction described above, the size of the vibration body 11 in the Z axis direction as the direction of the input axis of the angular-velocity can be reduced so as to correspond to the size of the driving plate 121, 122 and the detection plates 151, 152 in their width-wise direction. Accordingly, when this vibration body 11 is assembled into the electronic control appliance 20, the size $L_2$ in the direction of the height of the case 22 can be reduced. Further, because the printed circuit board 21 constituting the electronic control appliance 20 can be arranged in parallel with the plane of the X- and Y-axis directions, wiring of the driving plates 121, 122 and the detection plates 151, 152 to the printed board 21 can be made easily.

Though the vibrating body 11 is constituted into the tuning fork type in the embodiment described above, the vibration body 11 need not particularly be of the tuning fork type. For example, the vibration body 111 can be constituted into a sound plate type. In this case, a pair of detection plates 151 and 152 are so formed as to protrude from both sides of the main body portion of the sound plate type vibration body 111, and the driving piezoelectric devices 161 and 162 are bonded to both side surfaces of the detection plates 151 and 152 of the sound plate type vibration body 111, respectively. The detection plates 151 and 152 protrude in such a manner as to correspond to the vibrating direction due to the A.C. signals generated by the driving piezoelectric devices 161 and 162, and the detection piezoelectric devices 171 and 172 are bonded to the surfaces of the detection plates 151 and 152 which are orthogonal to the vibrating direction due to the A.C. signals.

Here, the vibration body 111 is so supported by the needle-like support members 141 and 142 as to be capable of vibration. When the vibration plate 111 is vibrated by the A.C. signals, the detection plates 151 and 152 are vibrated in the Y-axis direction by the Coriolis force, and signals are outputted from the detection piezoelectric devices 171 and 172 in such a manner as to correspond to the Coriolis force.

Figure 4:
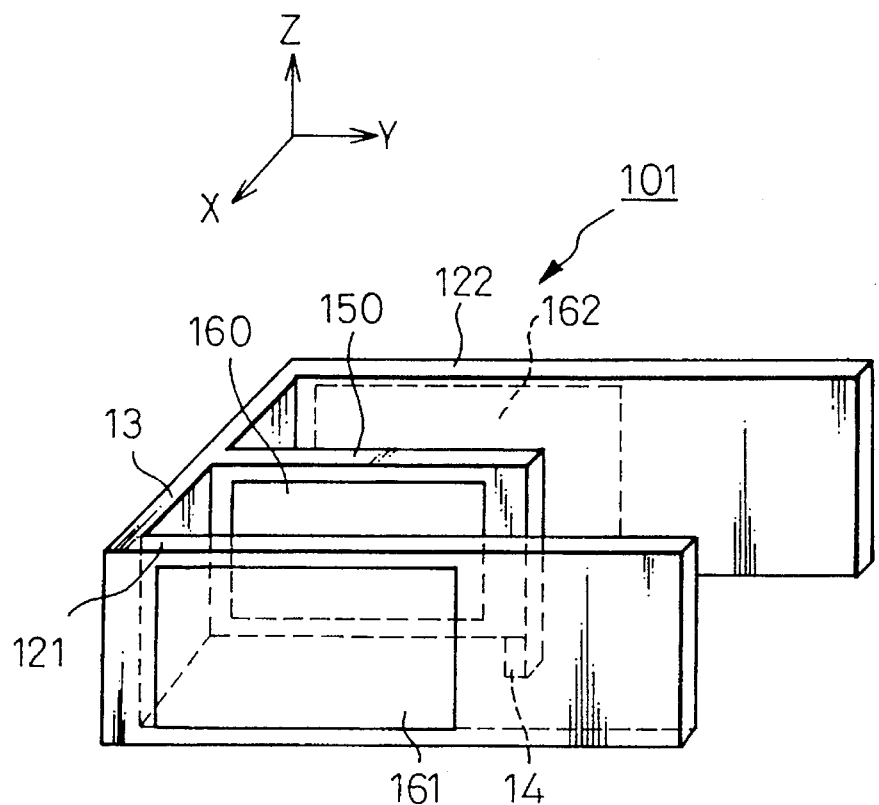
FIG. 4 is an explanatory view useful for explaining the third embodiment of the present invention.
Figure 5:
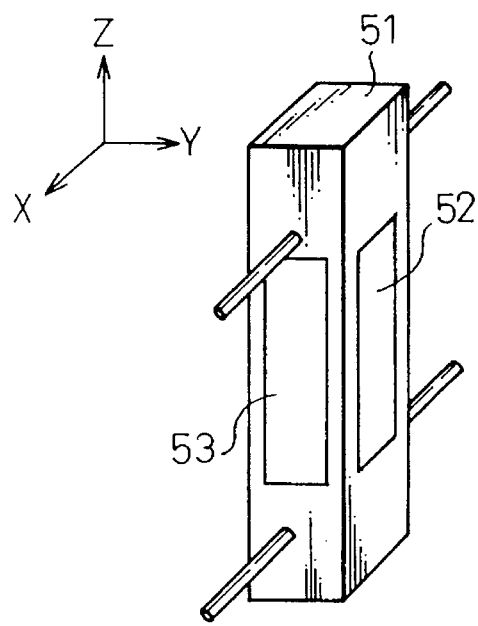
FIG. 5 is an explanatory view useful for explaining an angular-velocity sensor according to the prior art.
Figure 6:
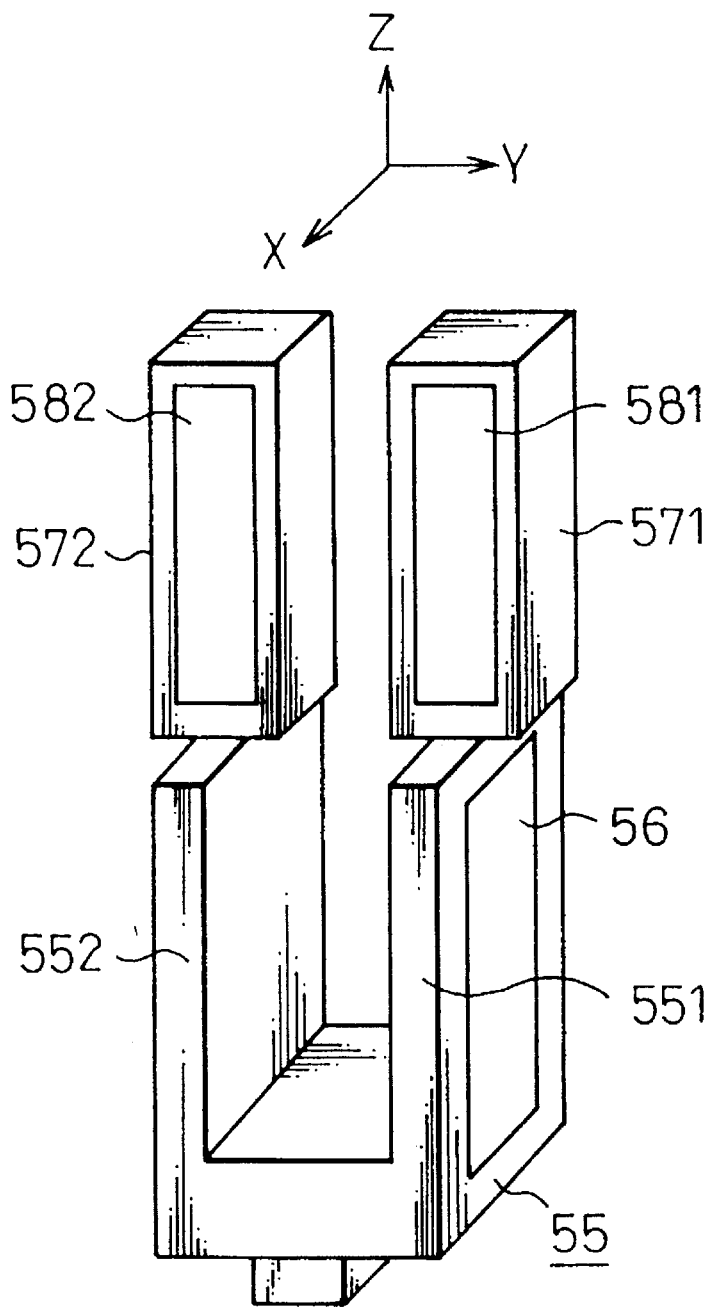
FIG. 6 is an explanatory view showing another example of the angular-velocity sensor according to the prior art.

The vibration-type angular-velocity detector according to another embodiment of the present invention is shown in FIG. 4. In this case, the proximal end portions of the vibration plates 121 and 122 are connected by the connecting plate 13, and the detection plate 150 protrudes substantially from the center of the connecting plate 13. The support member 14 is formed at the substantial centroid of the vibration body 101 at the distal end portion of the detection plate 150. The driving piezoelectric devices 161 and 162 are bonded to the driving plates 121 and 122, respectively, and the detection piezoelectric device 160 is bonded to the detection plate 150.

Here, when the A.C. signal is applied to the driving piezoelectric devices 161 and 162, the driving plates 121 and 122 are symmetrically driven so that their directions are mutually opposite in the X-axis direction. When the device has an angular-velocity around the Z-axis, the driving plates 121 and 122 receive the forces, the directions of which are mutually opposite, in the Y-axis direction due to the Coriolis force. As a result, because the driving body 101 is supported, at the centroid thereof, by the support member 14, bending vibration occurs round the Z-axis in the detection plate 150 with the support member 14 being the center, nd the detection piezoelectric device 160 outputs the signal corresponding to the Coriolis force.

As described above, in the vibration-type angular-velocity sensor according to the present invention, the vibrating body vibrates in a direction perpendicular to the longitudinal direction of the vibration body, and the Coriolis force acting in the longitudinal direction of the vibrating body is detected. Accordingly, the size of the vibration body, particularly in the direction of the input axis of the angular-velocity, can be reduced without bringing the longitudinal direction of the vibration body into conformity with the axis of the angular-velocity. In other words, the angular-velocity sensor can be assembled easily into a electronic control appliance for controlling the vehicle, and can be effectively applied to posture control system for a 4 WD vehicle or a navigation system, for example.

The third embodiment of the present invention can particularly reduce the size in comparison with the second embodiment, and can be more stably the vibrating state. Further, the third embodiment can restrict the expansion of the sensor in the transverse direction as a whole.

We claim:

1. A vibration angular-velocity sensor comprising:
   a vibrating body which vibrates in an x-axis direction, said x-axis direction being perpendicular to a longitudinal direction of the vibrating body; and
   a Coriolis force detection device disposed on the vibrating body so as to extend in the x-axis direction, said Coriolis force detection device vibrating in the longitudinal direction when said Coriolis force detection device undergoes an angular velocity about a z-axis direction, said z-axis direction being perpendicular to both the x-axis and longitudinal directions,
   wherein said Coriolis force detection device detects a Coriolis force generated in the longitudinal direction when said Coriolis force detection device vibrates in the longitudinal direction.

2. A vibration angular-velocity sensor according to claim 1, wherein said vibrating body comprises:
   a connecting plate;
   a first plate having a face and a second plate having a face, said first and second plates being disposed on the connecting plate such that the first, second and connecting plates form a U-shaped member, said first and second plates being parallel such that the first plate face opposes the second plate face,
   wherein the first plate face and the second plate face are parallel with the longitudinal direction.

3. A vibration angular-velocity sensor according to claim 2, wherein said Coriolis force detection device disposed on said vibrating body comprises:
   a third plate having a face disposed on a side of the first plate; and
   a fourth plate having a face disposed on a side of the second plate,
   wherein said third plate and said forth plate extend in opposition directions and wherein said faces of the third and the fourth plates are parallel with said connecting plate.

4. A vibration angular-velocity sensor according to claim 3, wherein a rectangular piezoelectric driving device is disposed on each of said first and second plates, said first and second plates vibrating in opposite directions when a voltage is applied to the piezoelectric driving device, and wherein a rectangular piezoelectric detection device is disposed on each of said third and fourth plates, said Coriolis force detection device detecting a voltage generated in said piezoelectric detection device when said third and fourth plates are vibrated by the Coriolis force.

5. A vibration angular-velocity sensor according to claim 2, wherein said Coriolis force detection device is a plate having opposed faces, said opposed faces of the Coriolis force detection device being parallel with each face of the first and the second plates, one end of said detection device plate being connected to a central portion of said connecting plate and the other end acting as a stationary end at a center of gravity of said vibrating body including the direction device plate.

6. A vibration angular-velocity sensor according to claim 5, wherein a rectangular piezoelectric driving device is disposed on each of said first and second plates, said first and second plates vibrating in opposite directions when a voltage is applied to the piezoelectric driving device, and wherein a rectangular piezoelectric detection device is disposed on each of said opposed faces of the detection device plate, said Coriolis force detection device detecting a voltage generated in said piezoelectric detection device when said detection device plate is vibrated by the Coriolis force.

7. A vibration angular-velocity sensor comprising:
   a vibrating body having a longitudinal side disposed in a y-axis direction constructed and arranged to allow the vibrating body to vibrate in an x-axis direction at a predetermined frequency, said x-axis direction being perpendicular to the y-axis direction; and a coriolis force detection device having an end disposed on the longitudinal side of the vibrating body so as to extend in the x-axis direction, said coriolis force detection device vibrating in the y-axis direction when said coriolis force detection device undergoes an angular velocity about a z-axis direction, said z-axis direction being perpendicular to both the x-axis and y-axis directions, wherein said coriolis force detection device detects a coriolis force generated in the y-axis direction when said coriolis force detection device vibrates in the y-axis direction.

8. A vibration angular-velocity sensor according to claim 7, wherein said vibrating body comprises:

a connecting plate;

a first plate having a face and a second plate having a face, said first and second plates being disposed on the connecting plate such that the first, second and connecting plates form a U-shaped member, said first and second plates being parallel such that the first plate face opposes the second plate face, wherein the first plate face and the second plate face are parallel with the y-axis direction.

* * * * *